United States Patent [19]
Yuen

[11] Patent Number: 5,575,423
[45] Date of Patent: Nov. 19, 1996

[54] TUBE NOZZLE HAVING THERMAL TRANSIENT REDUCTION

[75] Inventor: Jim L. Yuen, Thousand Oaks, Calif.

[73] Assignee: Rockwell International Corporation, Seal Beach, Calif.

[21] Appl. No.: 316,617

[22] Filed: Sep. 30, 1994

[51] Int. Cl.$^6$ .................................................. B05B 15/00
[52] U.S. Cl. ........................................ 239/397.5; 239/566
[58] Field of Search ............................... 239/566, 397.5, 239/591; 285/47

[56] References Cited

U.S. PATENT DOCUMENTS

| | | | |
|---|---|---|---|
| 1,396,210 | 11/1921 | Humphrey | 239/566 X |
| 2,125,703 | 8/1938 | Williams | 285/47 X |
| 2,968,126 | 1/1962 | Richardson | 239/566 X |
| 4,125,359 | 11/1978 | Lempa | 239/397.5 X |
| 4,652,020 | 3/1987 | Gilroy | 285/47 |
| 4,952,218 | 8/1990 | Lipp et al. | 239/397.5 X |

FOREIGN PATENT DOCUMENTS

| | | | |
|---|---|---|---|
| 54-220 | 1/1979 | Japan | 239/397.5 |
| 2156463 | 10/1985 | United Kingdom | 285/47 |

Primary Examiner—Kevin P. Weldon
Attorney, Agent, or Firm—George A. Montanye; Harry B. Field; Steven E. Kahm

[57] ABSTRACT

A tube nozzle having a thermal insulative barrier in it to prevent thermal fatigue cracks due to thermal transients in tube nozzles for all kinds of pipe joints that carry fluids with temperatures that change rapidly. This is particularly useful in mixing tees, where two different temperature fluids meet. The use of this invention could increase safety and reliability of processing streams in processing plants involving fluids maintained at various constant or fluctuating temperatures.

10 Claims, 1 Drawing Sheet

TUBE NOZZLE HAVING THERMAL TRANSIENT REDUCTION

BACKGROUND OF THE INVENTION

1. Field of the Invention

A tube nozzle having insulative material for thermal transient mitigation.

2. Description of the Related Art

In the past, nozzles exposed to thermal transients did not have thermal barriers incorporated into the nozzle. As a result, these nozzles would fail by thermal fatigue cracking which arises from the temperature of the fluid flow changing rapidly as a result of upstream transients or changes in processes. The thermal stresses and strains are greatest at the tee intersection of a small tube with a larger tube or pipe. This interaction is called the tube nozzle in this invention.

SUMMARY OF THE INVENTION

The tube nozzle region of concern is at the inside diameter at the entrance of the larger pipe or tube as shown in FIG. 1. This tube nozzle radius region follows the temperature of the fluid flowing in the tube, while the heavier walled larger diameter pipe (manifold header) to which the nozzle is welded changes temperature at a much slower rate. This sets up large temperature differentials which result in local thermal strains at the tube nozzle radius region. By placing a thermal barrier at the tube nozzle radius region, the tube nozzle radius region can be buffered from the flowing fluid thermal transients. The thickness of the thermal barrier is determined by the insulation required to reduce the thermal response of the tube nozzle radius region to match that of the manifold header to which it is attached.

The thermal barrier can be either metallic or ceramic. Because ceramics generally have lower thermal conductivities than metals, the required thickness of the ceramic materials would be less. It can be formed on the inside diameter of the nozzle by a number of processes (e.g., plasma spray, arc welding, electrodeposition, vapor deposition, etc.). Alternatively, the thermal barrier can be prefabricated as a spool piece that is attached on the inside diameter by a joining process such as brazing, diffusion bonding, welding, or electrodeposition attachment.

OBJECT OF THE INVENTION

It is an object of the invention to mitigate thermal cracking in tube nozzles exposed to large thermal transients.

Another object of the invention is to extend life of heat exchangers.

Another object of the invention is to extend life of mixing tees.

Still another object is to facilitate fabrication of the tube nozzle.

A further object is to provide compatibility of thermal insulative material with base material.

It is yet another object of the invention to tailor the thickness of thermal material to minimize the thermal strains at the tube nozzle radius.

Other objects, advantages, and novel features of the present invention will become apparent from the following detailed description of the invention when considered in conjunction with the accompanying drawing.

DETAILED DESCRIPTION OF THE PREFERRED EMBODIMENT

Figure 1:
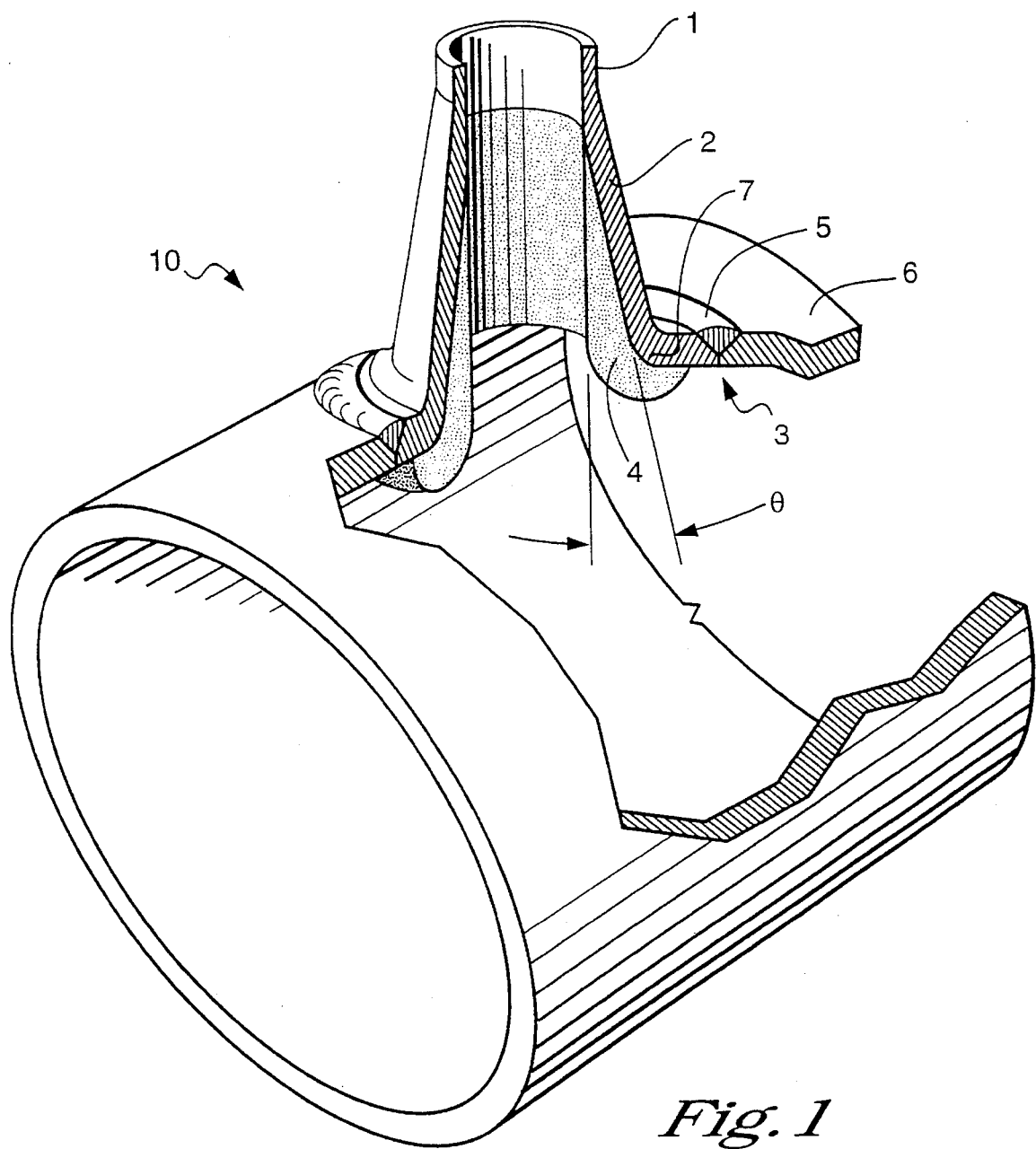
FIG. 1 is a cut away perspective cross section of a nozzle on a manifold header.

FIG. 1 shows in general a tube nozzle 10 with a thermal barrier 4 attached to a (or manifold header) pipe 6. The tube nozzle 10 has a tube section 1 having a uniform inside diameter. The tube section's 1 top portion is welded or otherwise connected to a tube which carries a flowing fluid. The tube is not shown for clarity. The tube nozzle 10 has a conical section 2 having an angle θ. The tube nozzle 10 has a base radius region 7 with a weld preparation region 3. A weld 5 connects the tube nozzle 10 to a pipe 6.

The tube nozzle 10 has a thermal barrier 4 in the conical section 2. The thermal material protects the area of the tube nozzle 10 which is most subject to thermal fatigue strains thus preventing cracking and extending the life of the tube nozzle. Candidates for the thermal barrier material are metals, ceramics, and intermetallics. Some of these candidates have properties that match the base material. Other materials, like ceramics, allow the thermal barrier to be much thinner than what is shown in the figure. Some intermetallics have a low thermal conductivity, so the thermal barrier can be much thinner than shown. The length of the deposit is a function of the ability to spray into the diameter of the conical section 2. Normally it is possible to spray into the nozzle about 1 diameter in length. The thickness of the thermal barrier deposit 4 can be tailored to achieve the desired thermal isolation of the tube nozzle 10 in order to protect the base radius region 7 of the tube nozzle.

The tube nozzle region of concern is at the inside diameter of the base radius region 7 at the entrance to the pipe 6, as shown in the schematic. This base radius region 7 follows a temperature of the flowing fluid in the tube, while the heavier walled pipe 6, to which the tube nozzle 10 is welded changes temperatures at a much slower rate. The fluid flow is from the tube 1 through the tube nozzle and into pipe 6. This sets up large temperature differentials which result in large local thermal strains at the base radius region 7. By placing a thermal barrier 4 in the conical section particularly in the base radius region 7, the base radius region can be buffered from the coolant thermal transients. The thickness of the thermal barrier 4 is determined by the amount of material needed to reduce the thermal response of the base radius region 7 to match that of the pipe 6 to which it is attached.

The conical section angle θ can be varied due to the amount of thermal barrier deposit 4 required for the thermal buffering. The angle can be varied due to the thermal conductivity of the material used; higher θ for higher thermal conductivity materials and lower θ angles for lower conductivity materials.

The wall thicknesses of the tube nozzle 10 vary in the tube section 1 the conical section 2 and the base radius region 7 depending on the stresses encountered in those regions.

It is important for the inside diameter of the tube nozzle 10 to be constant so that there is no restriction of the hydraulic diameter for a constant flow of fluid. The hydraulic diameter can be bigger in the base radius region 7 but not smaller, because a restricted fluid flow would affect the flow in the system.

The tube nozzle material can be steels, stainless steels, nickle-base alloys, cobalt-based alloys or any other like kind material.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A tube nozzle with a thermal barrier comprising, a tube section having a uniform inner diameter for connecting to a tube, a conical section having an increasing inner diameter, extending from the tube section and a base radius region extending from the conical section for connecting to a pipe, the conical section having an insulative material applied to the inner diameter, such that the inner diameter of the conical section and the inner diameter of the tube section are constant, to form a thermal barrier and protect the tube nozzle from thermal strains.

2. A tube nozzle with a thermal barrier as in claim 1 wherein, the tube nozzle has a wall thickness and the wall thickness varies proportional to the thermal stress in the tube nozzle.

3. A tube nozzle with a thermal barrier as in claim 1 wherein, the insulative material is a metal.

4. A tube nozzle with a thermal barrier as in claim 1 wherein, the insulative material is a ceramic.

5. A tube nozzle with a thermal barrier as in claim 1 wherein, the insulative material is an intermetallic.

6. A tube nozzle with a thermal barrier comprising, a tube section having a uniform inner diameter for connecting to a tube, a conical section having an increasing inner diameter, extending from the tube section and a base radius region extending from the conical section for connecting to a pipe, the conical section having an insulative material applied to the inner diameter, such that the thickness of the insulative material is greater adjacent the base region than adjacent the tube section, to form a thermal barrier and protect the tube nozzle from thermal strains.

7. A tube nozzle with a thermal barrier as in claim 3 wherein, the tube nozzle has a wall thickness and the wall thickness varies proportional to the thermal stress in the tube nozzle.

8. A tube nozzle with a thermal barrier as in claim 3 wherein, the insulative material is a metal.

9. A tube nozzle with a thermal barrier as in claim 6 wherein, the insulative material is a ceramic.

10. A tube nozzle with a thermal barrier as in claim 6 wherein, the insulative material is an intermetallic.

* * * * *